July 23, 1957   R. C. CAMERON ET AL   2,800,104
RADIO CONTROLLED ELECTRIC CUTANEOUS SIGNAL
TYPE ANIMAL OBEDIENCE DEVICE
Filed Feb. 9, 1955
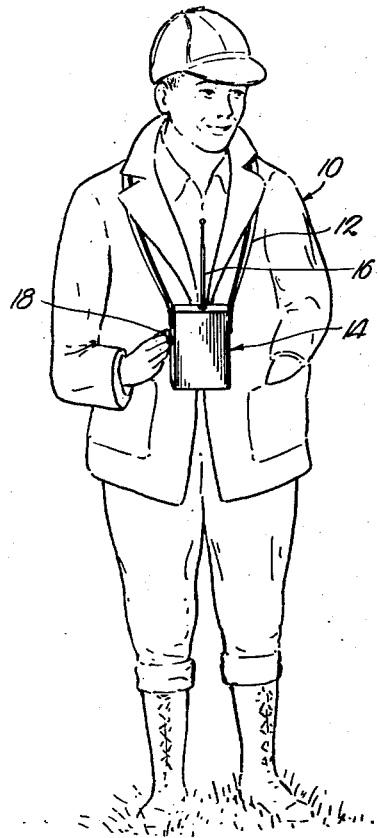
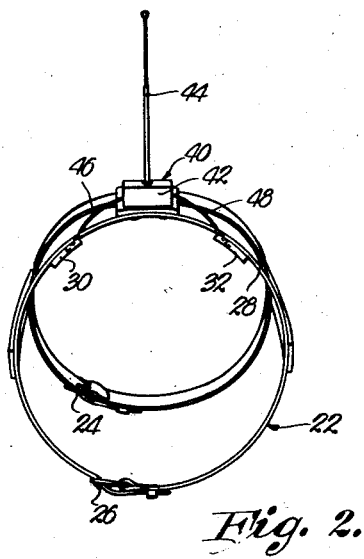
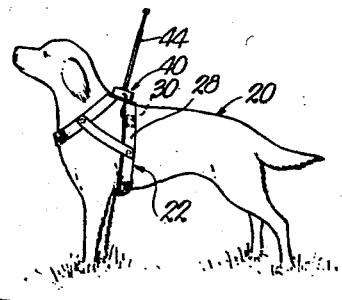
Fig. 1.
Fig. 2.
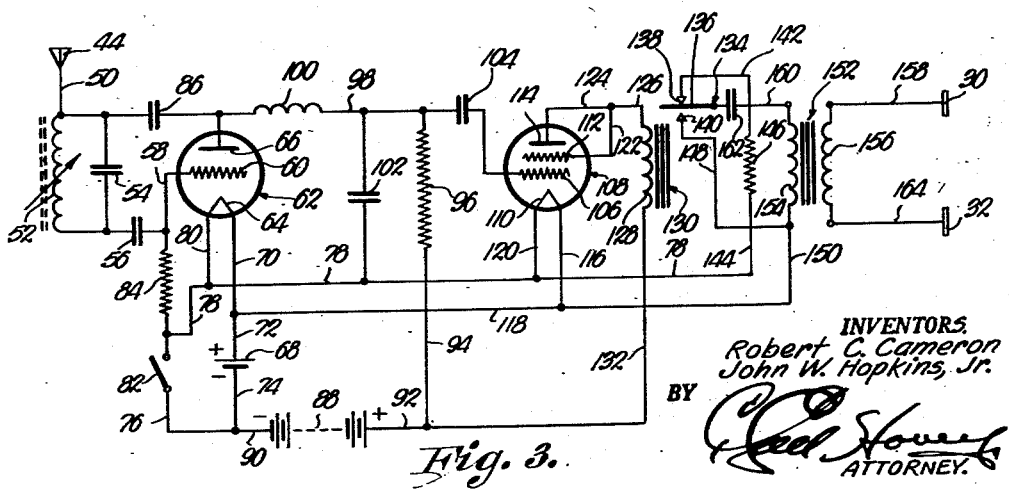
Fig. 3.
INVENTORS.
Robert C. Cameron
John W. Hopkins, Jr.
BY
ATTORNEY.

United States Patent Office 2,800,104
Patented July 23, 1957

2,800,104

RADIO CONTROLLED ELECTRIC CUTANEOUS SIGNAL TYPE ANIMAL OBEDIENCE DEVICE

Robert C. Cameron and John W. Hopkins, Jr., Leavenworth, Kans.; said Hopkins, Jr., assignor to said Cameron Application February 9, 1955, Serial No. 487,102

2 Claims. (Cl. 119—29)

This invention relates generally to the field of apparatus for use in training dogs and, more particularly to a radio controlled obedience device by which a trainer located at a considerable distance from a dog being trained may signal the latter of the trainer's dissatisfaction with a particular act or performance by the dog.

Various devices have heretofore been used in the training of dogs for racing, hunting or showing in obedience trials. All of same which have been otherwise effective, particularly in the respect that the trainer is enabled to instantly advise the dog of dissatisfaction, have involved either the impractical factor of parts extending between the trainer and the dog or the necessity of the trainer remaining at all times in close proximity to the dog. Additionally, many of such prior devices have been the subject of considerable criticism as being inhumane in their manner of impressing upon the dog the fact of the trainer's dissatisfaction.

It is the primary object of this invention to overcome these and other objections and disadvantages connected with prior apparatus used for the obedience training of dogs by providing improved, radio controlled, obedience apparatus including a small, portable radio transmitter adapted to be carried by the trainer, a small, portable radio receiver adapted to be carried by the dog on the harness of the latter, means also carried by the harness of the dog and responsive to the radio receiver thereon for producing a potential suitable for administering a mild and unharmful but effective electrical shock to the dog, and electrode structure upon the harness worn by the dog for applying such potential to the latter.

Other important objects of this invention, including significant details of construction by which the number and size of parts required are reduced to render the device carried by the dog as small as possible, will be made clear or become apparent as the following description of the invention progresses.

In the accompanying drawings:

Figure 1 is a perspective view of a trainer and a dog showing the portable radio transmitter being carried and operated by the trainer and the radio receiver and shock administering mechanism installed on a harness worn by the dog;

Fig. 2 is a perspective view of the harness per se illustrating the radio receiver, shock administering electrodes and other parts emplaced thereon; and Fig. 3 is a schematic diagram of the radio receiver and means for producing and administering a shocking potential.

Referring now to the accompanying drawings the numeral 10 generally designates a trainer and the numeral 20 a dog to be trained by the trainer 10 to obey the commands of the latter or to follow some other set behavior pattern for which the dog 20 is being trained. Carried by the trainer 10, as by means of a strap 12 is a small, portable radio transmitter generally designated 14 having an antenna 16 mounted thereon and a key or the like 18 adapted to be operated by the trainer 10. It will be understood that the transmitter 14 normally carries its own self-contained batteries or other power source (not shown) and that the transmitter 14 is adapted upon operation of the key 18 by the trainer 10 to emit or transmit from the antenna 16 a radio frequency signal adapted to be received by the dog carried radio receiver hereinafter described. It may be further observed that the transmitter 14 is preferably adapted for emitting an unmodulated or continuous wave type signal of frequency within the very high or ultrahigh frequency bands.

The dog 20 wears a harness generally designated 22 having a pair of buckle clasps 24 and 26 adapted for fastening beneath the dog 20 to maintain the harness 22 in place on the latter. Such harness 22 may, except as otherwise hereinafter noted, be conventional in character. Fastened on the inner side of a strap 28 of the harness 22, in order to be adjacent and in contact with the shoulders of the dog 20, are a pair of electrodes 30 and 32 of metallic conductive material, one of same being upon each of the shoulders of the dog 20. Also carried by the harness 22, preferably adjacent the top thereof, is a radio receiver generally designated 40 including a small housing 42 fastened to the harness 22, a receiving antenna 44 extending upwardly from housing 42, and a pair of lead wires 46 and 48 respectively connected with electrodes 30 and 32. It may be noted that antennas 16 and 44 are preferably of the tubular, variably extensible type for exact tuning to a frequency chosen for operation, although antenna 44 should be kept comparatively short for obvious reasons.

Referring now to the schematic circuitry of Fig. 3, it will be seen that the circuitry for radio receiver 40 preferably comprises a self-quenched, super-regenerative detector coupled with a relay operating stage for controlling the charging and discharging of a capacitor coupled through a step-up transformer with the shocking electrodes 30 and 32 for supplying the required potential to the latter responsive to detection of a signal from transmitter 14 by the receiver 40. More specifically, the antenna 44 is coupled through a conductor 50 with one end of a tank circuit comprised of a slug tuned inductance 52 and a fixed capacitor 54. The other end of tank circuit 52—54 is coupled through a capacitor 56 and a conductor 58 with the grid 60 of a directly heated triode vacuum tube 62 also provided with a filament 64 and a plate 66. Filament 64 is coupled with a batery 68 for providing heater current therefor by means of conductors 70, 72, 74, 76, 78 and 80 and a normally open power switch 82 interposed in series between conductors 76 and 78. It may be noted that tube 62 is preferably of the subminiature type provided with a filament 64 adapted to operate on 1.5 volts D. C. which is supplied by the small battery 68, conductor 72 being coupled with the positive terminal of the latter and conductor 74 being coupled with the negative terminal thereof. Grid 60 is coupled with the conductor 78, which comprises the "ground" or reference potential portion of the circuitry to which the negative terminal of battery 68 is connected, such connection of grid 60 to "ground" 78 being through a large resistance 84. Plate 66 of tube 62 is coupled with grid 60 thereof through a feedback capacitor 86, tank 52—54, coupling capacitor 56 and conductor 58.

A B-plus supply is provided by a miniature battery 88 having a potential of the order of 45 volts D. C., for instance. The negative terminal of battery 88 is coupled through a conductor 90, conductor 76 and switch 82 (when the latter is closed) with "ground" conductor 78, the positive terminal of battery 88 being coupled through a conductor 92, a conductor 94, a plate resistance 96, a conductor 98 and a choke 100 with plate 66 of tube 62.

Conductor 98 is bypassed through a capacitor 102 to "ground" conductor 78.

Plate 66 of tube 62 is coupled through choke 100, conductor 98 and a coupling capacitor 104 to the control grid 106 of a second vacuum tube 108 also provided with a directly heated filament 110, one or more additional grids 112 and a plate 114.

Filament 110 of tube 108, which is preferably also of the subminiature, 1.5 volt filament type, is coupled with filament supply battery 68 through conductors 116, 118 and 72 to the positive terminal of battery 68 and a conductor 120 to the "ground" conductor 78, which leads through switch 82 and conductors 76 and 74 to the negative terminal of battery 68. Plate 114 and grids 112 are connected together by conductors 122 and 124 and are coupled by a conductor 126 with one side of the coil 128 of a relay 130, the other side of coil 128 being coupled with the positive terminal of battery 88 through a conductor 132 and conductor 92. Relay 130 is provided with a switch 134 responsive to energization of coil 128 to move a pole piece 136 from its position of normal engagement with one stationary contact 138 into engagement with a second stationary contact 140. Contact 138 is coupled through conductors 142 and 144 and, if desired, an optional current limiting resistance 146 with "ground" conductor 78. Contact 140 is coupled through conductors 148, 150, 118 and 72 with the positive terminal of battery 68.

A voltage step-up transformer 152 has a primary winding 154 and a secondary winding 156. One end of primary winding 154 is connected through a conductor 160 and a relatively large capacitor 162 with pole piece 136. The other end of primary 154 is coupled with contact 140 through conductor 148 and with the positive terminal of battery 68 through conductors 150, 118 and 72. One end of secondary winding 156 is coupled through a conductor 158 with electrode 30, and electrode 32 is coupled directly with the other end of secondary winding 156 by means of a conductor 164.

In operation, the apparatus of this invention functions in the manner now to be described. Upon operation of the key 18 of transmitter 14 by the trainer 10, transmitter 14 transmits from antenna 16 a radio signal of predetermined frequency. Prior to operation of the key 18 by trainer 10 no signal is emitted from the antenna 16.

Presuming that the power switch 82 of the receiver 40 is closed the filaments 64 and 110 of tubes 62 and 108 will be heated and a positive plate potential will be supplied from battery 88 to each of the plates 66 and 114 of tubes 62 and 108 respectively through the circuits previously traced. It will be recognized by those skilled in the art that the circuitry for tube 62 comprises a self-quenched super-regenerative detector whose quench frequency is determined by the time constant of capacitor 56 and resistance 84, the latter being preferably relatively large to establish a suitable quenching frequency.

Presuming that no signal is being emitted from antenna 16 of transmitter 14 so that no signal is being picked up by antenna 44 of receiver 40 at the operating frequency at which tank 52—54 has been pretuned by adjustment of the plug of the inductance 52, the tube 62 will, by virtue of the feedback coupling through capacitor 82 from plate 66 to grid 60 thereof, be operating in the familiar no signal or "hiss" condition in which the only output being coupled from plate 66 to grid 108 to capacitor 104 consists of random spikes or pulses of noise having little power content. The self-developed quenching signal is by-passed to "ground" conductor 78 through capacitor 102, while the choke 100 tends to remove any radio frequency components from the output of plate 66.

When no signal from transmitter 14 is being received by antenna 44, tube 108 will conduct, if at all, only very slightly in response to the random noise spikes resulting from the thermal noise generator effects of antenna 44 and the noise of tube 62 itself, which conduction through tube 108 will be insufficient to energize the coil 128 of relay 130, which is in the plate circuit of tube 108. Accordingly, pole 136 of switch 134 will remain in its normal position in engagement with contact 138. When pole 136 is so disposed in its normal position, capacitor 162 will be charged by battery 68 through a circuit traced from the positive terminal of battery 68 through conductors 72, 118 and 150, primary 154 of transformer 152 and conductor 160 to capacitor 162, thence from capacitor 162 through pole 136, contact 138, conductor 142, limiting resistance 146 (if provided), conductors 144 and 78, now closed switch 82 and conductors 76 and 74 to the negative terminal of battery 68.

When the trainer 10 operates the key 18 on transmitter 14 to transmit a signal from the antenna 16 thereof, such signal is received by antenna 44 of receiver 40 and detected by the tube 62. As is well known to those in the art, a self-quenched, super-regenerative detector, such as that of receiver 40, operates with extremely high gain and very close to its point of oscillation. When the signal from transmitter 14 is received by antenna 44 and detected by the super-regenerative tube 62, such detected signal is applied through coupling capacitor 104 to control grid 106 of the tube 108. This causes tube 108 to conduct steadily and substantially. Such a steady and substantial conduction by tube 108 will cause a flow of current through coil 128 of relay 130 sufficient to energize the latter, it being noted that plate relay 130 is of a type adapted to energize only upon the flow of a predetermined amount of current through the coil 128 thereof.

Energization of relay 130 will swing pole 136 out of engagement with contact 138 and into engagement with contact 140. Upon making of the contact between pole 136 and contact 140 the charge previously stored in capacitor 162 will be rapidly discharged through primary 154 of transformer 152 through a circuit traceable from capacitor 162 through pole 136, contact 140, conductor 148, primary 158 and conductor 160 back to capacitor 162. Such rapid discharge of current from capacitor 162 through primary 154 will create a potential of relatively high voltage but low current value across the secondary 156 of transformer 152. Such pulse of high voltage potential is carried by conductors 158 and 164 to electrodes 30 and 32 which are in contact with the shoulders of the dog 20 and serve to carry such potential to the dog 20 for administering a shock to the latter.

It is noted that the resistance 146 may be provided, if desired, to prevent any possibility of a shock being administered to the dog 20 when the power switch 82 is first closed and the capacitor 162 first commences to charge; obviously, it could be omitted if desired. It is further noted that all of the components of the receiver 40 are preferably of the miniaturized type, and particularly, that tubes 62 and 108 should be of the subminiature, low current drain type. Batteries 68 and 88 may be of the miniaturized types now available and could, if desired, be separately suspended from the harness 22, rather than housed within the receiver housing 42, as illustrated.

It will thus be seen that the apparatus of this invention provides means uniquely adapted for use in the training of a dog 20 in situations where it is important that the trainer 10 be enabled to instantly evidence and communicate to the dog 20 his dissatisfaction with some action taken or omitted by the latter. It will be further apparent that the apparatus of this invention permits an electrical shock, which has been found quite effective in the disciplinary training of dogs, to be administered to a dog 20 even though the trainer 10 is at some distance from the dog 20.

Obviously, many minor changes and modifications could be made from the exact structure disclosed without departing from the true spirit and intention of this invention. It is especially noted that the circuitry shown in Fig. 3 is merely intended to be illustrative, and that any high gain receiver circuitry of suitable compactness embodying signal responsive switching means such as exemplified by the tube 108 and the relay 130 for alternately charging a capacitor 162 and controlling the discharge thereof to electrodes 30 and 32 could be employed. Accordingly, it is to be understood that this invention should be deemed limited only by the scope of the appended claims.

Having thus described the invention what is claimed as new and desired to be secured by Letters Patent is:

1. Apparatus for use in training a dog, said apparatus comprising a portable radio transmitter adapted to be carried by a trainer said transmitter transmitting an unmodulated, continuous wave type signal of relatively high frequency; switch means on said transmitter whereby the trainer may control emission of said signal; a harness adapted to be worn by the dog; a portable, super-regenerative, radio receiver mounted on the harness and adapted to receive said signal from said transmitter; a relay mounted on the harness and having a coil and a single pole, double throw relay switch provided with a pole normally in engagement with one contact and adapted to move into engagement with the other contact when the coil is energized; means electrically coupling the coil with the receiver for energization of the coil when the receiver is receiving said signal from the transmitter; a capacitor mounted on the harness; a source of direct current potential carried by the harness; a voltage step-up transformer carried by the harness and having a primary winding and a seconday winding; means electrically coupling the capacitor with the source through said pole and said one contact; means for electrically connecting the capacitor across said primary winding through said pole and said other contact; a pair of electrodes disposed on the harness for contacting the dog; and means electrically coupling said secondary winding with said electrodes, whereby said source is normally charging said capacitor through the pole and said one contact and, when said signal is received by the receiver, said coil of the relay is energized to move said pole into engagement with said other contact discharging the capacitor through said primary winding to produce a high voltage potential in said secondary winding and between said electrodes for administering a shock to the dog.

2. Apparatus for use in training a dog, said apparatus comprising a relatively small, portable radio-transmitter to be carried by a trainer, said transmitter transmitting an unmodulated, continuous wave type signal of relatively high frequency; switch means on said transmitter whereby the trainer may control emission of said signal; a harness adapted to be worn by the dog; a pair of electrodes disposed on the harness for contacting the dog; a relatively small, portable radio-receiver mounted on the harness for receiving said signal, said receiver producing an electrical output during the period said signal is received; a relay having an operating coil and a switch movable to one position when the coil is energized; means coupling the coil with the receiver for energization by said output of the latter; a device carried by the harness and including a condenser and means for storing an electrical charge in the condenser; contact means for said relay switch when the latter is disposed in said one position; and means connecting said condenser, and said contact means with the electrodes for delivering said electrical charge to the dog upon energization of the coil.

References Cited in the file of this patent

UNITED STATES PATENTS

| | | |
|---|---|---|
| 2,023,950 | Carter | Dec. 10, 1935 |
| 2,138,894 | Ware | Dec. 6, 1938 |
| 2,703,344 | Anderson | Mar. 1, 1955 |
| 2,741,224 | Putman | Apr. 10, 1956 |

FOREIGN PATENTS

| | | |
|---|---|---|
| 113,556 | Sweden | Jan. 18, 1945 |
| 920,945 | Germany | Dec. 2, 1954 |

OTHER REFERENCES

Washington Times-Herald, June 1, 1941, page 4 of Magazine section (A dog that's "wired" to pick up police calls).